US009436176B2

(12) United States Patent
Nakamura

(10) Patent No.: US 9,436,176 B2
(45) Date of Patent: Sep. 6, 2016

(54) NUMERICAL CONTROL METHOD AND DEVICE THEREOF

(75) Inventor: Naoki Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 742 days.

(21) Appl. No.: 13/642,726

(22) PCT Filed: Apr. 21, 2010

(86) PCT No.: PCT/JP2010/002883
§ 371 (c)(1),
(2), (4) Date: Oct. 22, 2012

(87) PCT Pub. No.: WO2011/132221
PCT Pub. Date: Oct. 27, 2011

(65) Prior Publication Data
US 2013/0041498 A1    Feb. 14, 2013

(51) Int. Cl.
*G05B 19/4061*    (2006.01)

(52) U.S. Cl.
CPC . *G05B 19/4061* (2013.01); *G05B 2219/35316* (2013.01); *G05B 2219/49154* (2013.01)

(58) Field of Classification Search
CPC .................................................. G05B 19/4061
USPC .......................................................... 700/186
See application file for complete search history.

(56) References Cited

U.S. PATENT DOCUMENTS

| 7,239,938 | B2 | 7/2007 | Otsuki et al. | |
|---|---|---|---|---|
| 7,689,300 | B2 * | 3/2010 | Naganawa et al. | 700/61 |
| 2004/0232866 | A1 | 11/2004 | Greff et al. | |
| 2005/0071041 | A1 * | 3/2005 | Wampler et al. | 700/178 |
| 2005/0090930 | A1 * | 4/2005 | Otsuki et al. | 700/178 |
| 2011/0035044 | A1 | 2/2011 | Takahashi et al. | |

FOREIGN PATENT DOCUMENTS

| DE | 101 14 811 A1 | 10/2002 |
|---|---|---|
| DE | 103 21 241 A1 | 12/2004 |

(Continued)

OTHER PUBLICATIONS

Jung et al., NC post-processor for 5-axis Milling Machine of Table-Rotating/Tilting Type, Journal of Materials Processing Technology 130-131 (2002) 641-646.*

(Continued)

*Primary Examiner* — Mohammad Ali
*Assistant Examiner* — John Park
(74) *Attorney, Agent, or Firm* — Sughrue Mion, PLLC

(57) ABSTRACT

In order to provide a numerical control method and a device thereof capable of avoiding interference of a tool with a rotary table or a workpiece, without worker's manual operation for performing an interference avoiding operation, there is provided an avoidance-height calculating unit that calculates an interference avoidance height of the tool at which the tool does not interfere with the rotary table and the workpiece over an entire movable range of a rotary shaft to which the movement command is input, an interference determining unit that determines whether the tool will interfere with the rotary table and the workpiece by comparing a current height of a tip of the tool with the interference avoidance height, and an avoiding-operation generating unit that generates a command for movement in a tool shaft direction to the interference avoidance height.

19 Claims, 5 Drawing Sheets

(56) References Cited

FOREIGN PATENT DOCUMENTS

| | | | |
|---|---|---|---|
| JP | 56-159709 A | 12/1981 |
| JP | 2-116302 U | 9/1990 |
| JP | 3-196938 A | 8/1991 |
| JP | 5-8604 U | 2/1993 |
| JP | 6-119031 A | 4/1994 |
| JP | 7-121221 A | 5/1995 |
| JP | 8-263124 A | 10/1996 |
| JP | 10-232706 A | 9/1998 |
| JP | 2000-61769 A | 2/2000 |
| JP | 2002-239875 A | 8/2002 |
| JP | 2005-128686 A | 5/2005 |
| WO | 01/75537 A1 | 10/2001 |
| WO | 2009130759 A1 | 10/2009 |

OTHER PUBLICATIONS

Office Action dated Oct. 28, 2013, issued by the German Patent and Trademark Office in counterpart German Application No. 11 2010 005 510.6.

Notification of Reasons for Refusal, dated Sep. 14, 2011, issued by the Japanese Patent Office in corresponding Japanese Application No. 2011-517533.

Notification of Reasons for Refusal, dated Feb. 2, 2012, issued by the Japanese Patent Office in corresponding Japanese Application No. 2011-517533.

Notice of Allowance, dated May 10, 2012, issued by the Japanese Patent Office in corresponding Japanese Application No. 2011-517533.

International Search Report (PCT/ISA/210), dated Jun. 1, 2010, issued by the International Searching Authority in corresponding International Application No. PCT/JP2010/002883.

Written Opinion (PCT/ISA/237) of the International Searching Authority, issued on Jun. 1, 2010 in corresponding International Application No. PCT/JP2011/002883.

Office Action dated Feb. 24, 2014 issued by the State Intellectual Property Office of the People's Republic of China in counterpart Chinese Patent Application No. 201080066363.5.

Office Action issued Jun. 10, 2016, issued by the German Patent and Trademark Office in counterpart German Application No. 112010005510.6 English translation.

* cited by examiner

NUMERICAL CONTROL METHOD AND DEVICE THEREOF

TECHNICAL FIELD

The present invention relates to a numerical control method and a device thereof for numerically controlling a machine tool, and particularly, to a numerical control method and a device thereof for a multiaxis machine tool which has a rotary shaft and is configured control position and posture of a tool.

BACKGROUND ART

A machine tool having a numerical control device performs machining while moving a movable unit by controlling each shaft such that a tool moves to a commanded position. In the machine tool having a rotary shaft, the rotary shaft rotates so as to change the posture of the tool relative to a workpiece. Therefore, machining may be performed on a sloping surface or a side surface of a workpiece.

In the machine tool having the rotary shaft, in a case of rotating the rotary shaft, due to the positional relation between the tool, a rotary table and a workpiece, the tool may interfere with the rotary table or the workpiece.

FIG. 2 is a schematic view illustrating an example of a machine tool having two rotary shafts provided to a rotary table. In FIG. 2, a rotary table of the machine tool to be an object of control has a rotary axis C for table rotation with respect to a Z axis and an inclined rotary axis A for tilting with respect to an X axis. Also, FIG. 6 is a view illustrating an example in which the tool interferes with the rotary table in a case of rotating the rotary axis A, and FIG. 7 is a view illustrating an example in which the tool interferes with a workpiece in a case of rotating the rotary axis C.

In the conventional numerical control device, in order to avoid interference of the tool with the rotary table or the workpiece, a worker manually evacuates the tool. Alternatively, a tool model representing a portion of the machine tool in a 3D shape is stored, and it is checked whether interference will occur. In a case of determining that interference will occur, the shaft operation stops immediately before the interference (see Patent Document 1, for instance).

CITATION LIST

Patent Document

Patent Document 1: JP-A-2005-128686

DISCLOSURE OF THE INVENTION

Problems that the Invention is to Solve

In the conventional numerical control device as described above, if the worker forgets evacuation of the tool, the tool may interfere with the rotary table or the workpiece. Further, in the interference check using tool models, complicated tool models should be created for every machine tool kind.

The present invention has been made to solve the above-described problems, and an object of the present invention is to obtain a numerical control method and a device thereof capable of avoiding interference of a tool with a rotary table and a workpiece during rotation of a rotary shaft, without worker's manual operation and without using complicated tool models.

Means for Solving the Problems

In order to solve the above-described conventional problems and accomplish the object, a numerical control method of the present invention is a numerical control method of controlling a multiaxis machine tool which has a rotary shaft and is configured to control a posture of a tool relative to a workpiece, the numerical control method comprising: a step of calculating an interference avoidance height of the tool at which the tool does not interfere with a rotary table and the workpiece over an entire movable range of the rotary shaft to which a movement command is input, the step being triggered by starting of the movement command of the rotary shaft; a step of determining whether the tool interferes with the rotary table or the workpiece by comparing a current Z axis height of a tip of the tool with the interference avoidance height obtained in the previous step; and a step of generating a command for movement in a tool shaft direction to the interference avoidance height when it is determined in the previous step that interference occurs.

Further, a numerical control method of the present invention is a numerical control method of controlling a multiaxis machine tool which has a rotary shaft and is configured to control the posture of a tool relative to a workpiece, the numerical control method comprising: a step of calculating an interference avoidance height of the tool at which the tool does not interfere with a rotary table and the workpiece over an entire movable range of the rotary shaft to which a movement command is input, the step being triggered by starting of the movement command of the rotary shaft; a step of determining whether the tool interferes with the rotary table or the workpiece by comparing a current Z axis height of a tip of the tool with the interference avoidance height obtained in the previous step; a step of performing warning without moving the rotary shaft to which the movement command is input and waiting for input of a command for starting an avoiding operation to the interference avoidance height, in a case where it is determined in the previous step that interference occurs; and a step of generating a command for movement in a tool shaft direction to the interference avoidance height when the command for starting the avoiding operation is output.

Further, in the numerical control method according to the present invention, in the step of calculating the interference avoidance height, in a case where the movement command of the rotary shaft is a command for rotating a rotary shaft for tilting the rotary table, a Z axis coordinate value of an intersection point of a circle having a radius, which is the longer of a distance from a center of the rotary shaft to an edge of the rotary table and a distance from the center of the rotary shaft to an edge of the workpiece, and a straight line in the tool shaft direction is obtained as the interference avoidance height.

Further, in the numerical control method according to the present invention, in the step of calculating the interference avoidance height, in a case where the movement command of the rotary shaft is a command for rotating a rotary shaft for rotating the rotary table without tilting the rotary table, a maximum height coordinate of the workpiece, which is input in advance, is obtained as the interference avoidance height.

Further, in the numerical control method according to the present invention, in the step of determining whether interference will occur, it is possible to select whether to determine whether the tool interferes with the rotary table or the workpiece.

Further, in the numerical control method according to the present invention, in the step of generating the movement command, it is possible to select whether to perform the interference avoiding operation to the interference avoidance height obtained in the step of calculating the interference avoidance height.

Further, a numerical control device of the present invention is a numerical control device for controlling a multiaxis machine tool which has a rotary shaft and is configured to control the posture of a tool relative to a workpiece, the numerical control device comprising: an avoidance-height calculating unit that calculates an interference avoidance height of the tool at which the tool does not interfere with a rotary table and the workpiece over an entire movable range of the rotary shaft to which a movement command is input, the calculation being triggered by start of the movement command of the rotary shaft; an interference determining unit that determines whether the tool will interfere with the rotary table or the workpiece by comparing a current Z axis height of a tip of the tool with the interference avoidance height obtained by the avoidance-height calculating unit; and an avoiding-operation generating unit that generates a command for movement in a tool shaft direction to the interference avoidance height when the interference determining unit determines that interference will occur.

Further, a numerical control device of the present invention is a numerical control device for controlling a multiaxis machine tool which has a rotary shaft and is configured to control the posture of a tool relative to a workpiece, the numerical control device comprising: an avoidance-height calculating unit that calculates an interference avoidance height of the tool at which the tool does not interfere with a rotary table and the workpiece over an entire movable range of a rotary shaft to which a movement command is input, the calculation being triggered by start of the movement command of the rotary shaft; an interference determining unit that determines whether the tool will interfere with the rotary table or the workpiece by comparing a current Z axis height of a tip of the tool with the interference avoidance height obtained by the avoidance-height calculating unit; a warning unit that performs warning without moving the rotary shaft to which the movement command is input and waiting for input of a command for starting an avoiding operation to the interference avoidance height, in a case where the interference determining unit determines that interference will occur; and an avoiding-operation generating unit that generates a command for movement in a tool shaft direction to the interference avoidance height when the command for starting the avoiding operation is output.

Further, in the numerical control device according to the present invention, in a case where the movement command of the rotary shaft is a command for rotating a rotary shaft for tilting the rotary table, the avoidance-height calculating unit obtains a Z axis coordinate value of an intersection point of a circle having a radius, which is the longer of a distance from a center of the rotary shaft to an edge of the rotary table and a distance from the center of the rotary shaft to an edge of the workpiece, and a straight line in the tool shaft direction as the interference avoidance height.

Further, in the numerical control device according to the present invention, in a case where the movement command of the rotary shaft is a command for rotating a rotary shaft for rotating the rotary table without tilting the rotary table, the interference-avoidance-height calculating unit obtains a maximum height coordinate of the workpiece, which is input in advance, as the interference avoidance height.

Further, in the numerical control device according to the present invention, the interference determining unit can select whether to determine whether the tool interferes with the rotary table or the workpiece.

Further, in the numerical control device according to the present invention, the avoiding-operation generating unit can select whether to perform the interference avoiding operation to the interference avoidance height obtained by the interference-height calculating unit.

Advantage of the Invention

According to the present invention, it is possible to avoid interference of the tool with the rotary table and the workpiece, without worker's manual operation for performing an interference avoiding operation and without using complicated tool models.

Also, in a case of determining that the tool will interfere with the rotary table or a workpiece, it is possible to perform warning and prevent an interference avoiding operation until a command for starting the interference avoiding operation is received from a worker. Accordingly, it is possible to prevent an interference avoiding operation in which a shaft operates without worker's intention.

Further, according to the present invention, it is possible to calculate the interference avoidance height by a small amount of information (the size and installation position of the workpiece, the coordinates of the center of the rotary table, and the like).

Furthermore, according to the present invention, in a case where it is known in advance that interference will not occur, it is possible to skip the interference determination. Moreover, it is possible to perform the interference determination only in a desired operation mode such as a handle feeding mode or a JOG feeding mode.

In addition, according to the present invention, in a case where there is a possibility of interference, it is possible to display only a warning message, and prevent an interference avoiding operation in which a shaft operates without worker's intention.

BEST MODE FOR CARRYING OUT THE INVENTION

First Embodiment

Hereinafter, a first embodiment of the present invention will be described with reference to the accompanying drawings.

Figure 1:
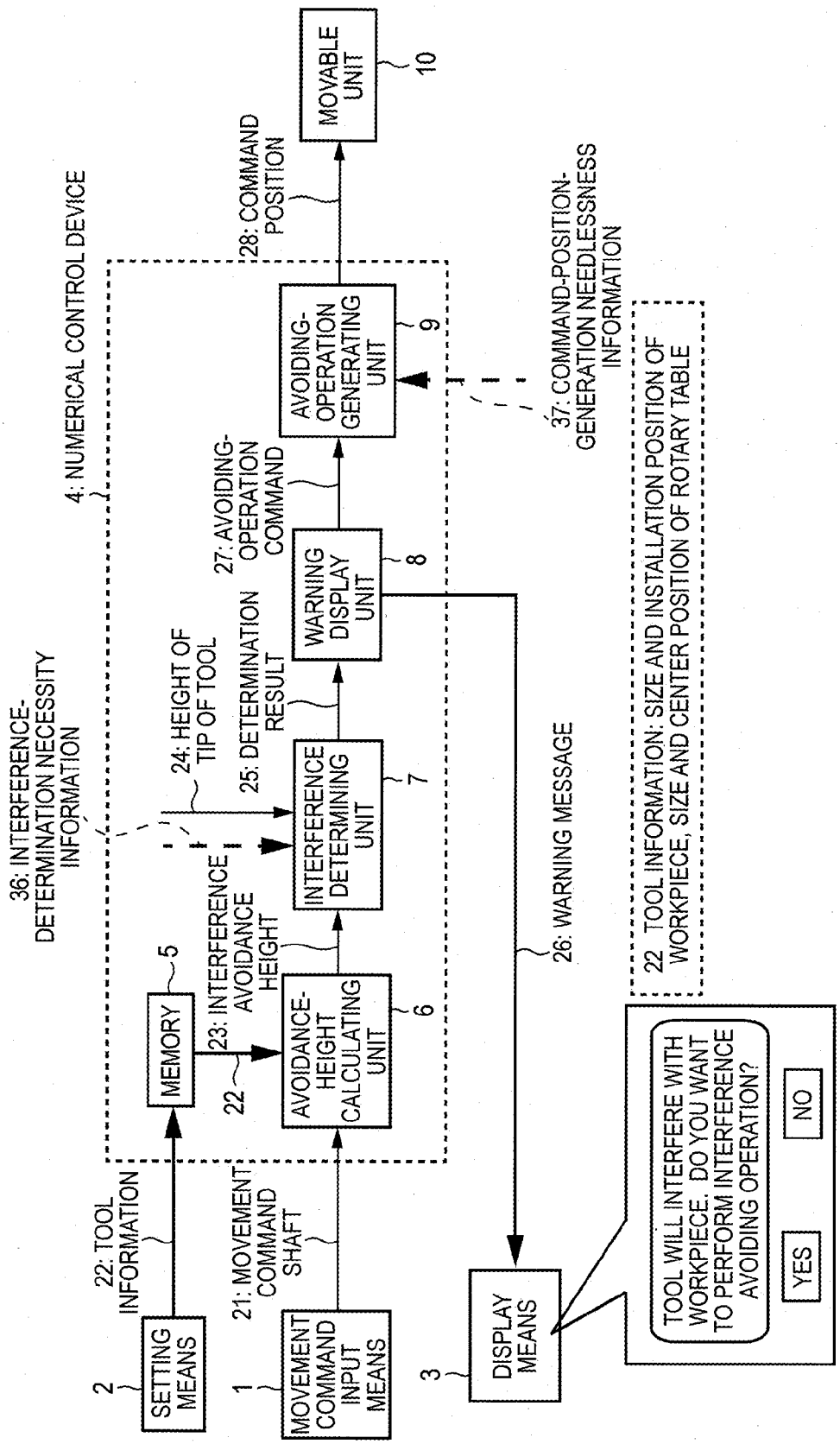
FIG. 1 is a block diagram illustrating a configuration of a numerical control device according to a first embodiment of the present invention.

FIG. 1 is a block diagram illustrating a configuration of a numerical control device according to a first embodiment of the present invention.

Referring to FIG. 1, in a case where a movement command shaft 21 input from a movement command input means 1 is a rotary shaft, an avoidance-height calculating unit 6 of a numerical control device 4 calculates an interference avoidance height 23 of a tool at which the tool does not interfere with a rotary table 31 and a workpiece 32 over the entire movable range of the rotary shaft to which a movement command is input, on the basis of tool information 22 stored in advance in a memory 5 of the numerical control device 4 by a setting means 2. The tool information 22 includes size and installation position of the workpiece and size and center coordinates of the rotary table.

An interference determining unit 7 compares a current height 24 of a tip of the tool (a Z axis coordinate regularly grasped by the numerical control device 4 for control) with the interference avoidance height 23 obtained by the avoidance-height calculating unit 6, thereby determining whether the tool 30 will interfere with the rotary table 31 and the workpiece 32, and outputs a determination result 25. In a case where information (data) 36 indicating that interference determination is unnecessary is input from an operation screen (operation screen for performing parameter setting with respect to whether to perform interference determination) or a programmable logic controller (PLC) (not shown) of the numerical control device 4, the interference determining unit 7 does not perform the interference determination.

In a case of determining that interference will occur on the basis of the determination result 25 of the interference determining unit 7, a warning display unit 8 outputs a warning message 26 to a display means 3 without moving the rotary shaft to which the movement command is input, waits for a worker's input for starting an avoiding operation to the interference avoidance height 23, and outputs an avoiding-operation command 27 if an input for starting the avoiding operation is received. As shown in FIG. 1, a display means 3 includes an operation screen which displays whether to avoid the interference avoiding operation ('YES' and 'NO') together with the warning message so as to enable the worker to select either of 'YES' or 'NO'. Further, in the present embodiment, the display means 3 configures a warning unit together with the warning display unit 8. The warning unit may perform warning only by sound.

An avoiding-operation generating unit 9 generates a command for movement in a tool shaft direction to the interference avoidance height 23 according to the avoiding-operation command 27, and outputs a command position 28 of the tool shaft to a movable unit 10.

Further, the software configuration of the numerical control device is the same as that of a general numerical control device configured by a CPU, a memory, and the like, and the avoidance-height calculating unit 6, the interference determining unit 7, the warning display unit 8, the avoiding-operation generating unit 9, and the like are configured by software.

Next, an operation of the numerical control device according to the first embodiment will be described.

Figure 2:
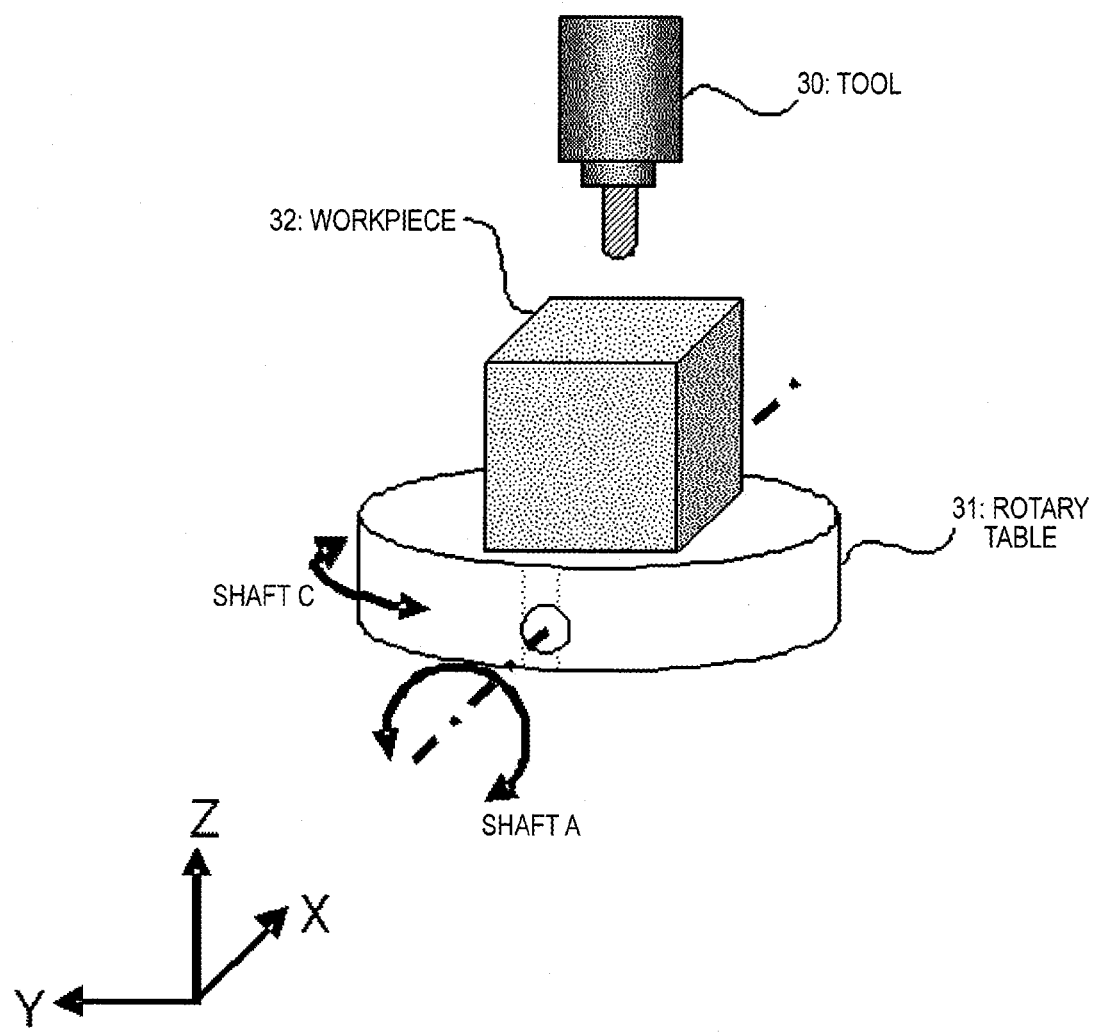
FIG. 2 is a schematic view illustrating a tool configuration of a machine tool according to the first embodiment of the present invention.

FIG. 2 is a schematic diagram illustrating an example of a machine tool to be an object of control in the first embodiment.

In FIG. 2, the machine tool to be an object of control includes a rotary table 31 having a rotary axis C for table rotation with respect to a Z axis and an inclined rotary axis A for tilting with respect to an X axis. The following description will be made under on the assumption that the tool configuration of the machine tool to be an object of control is as shown in FIG. 2. However, as long as the machine tool includes a rotary shaft and can control the posture of a tool relative to a workpiece, it is possible to use any tool configuration.

Figure 3:
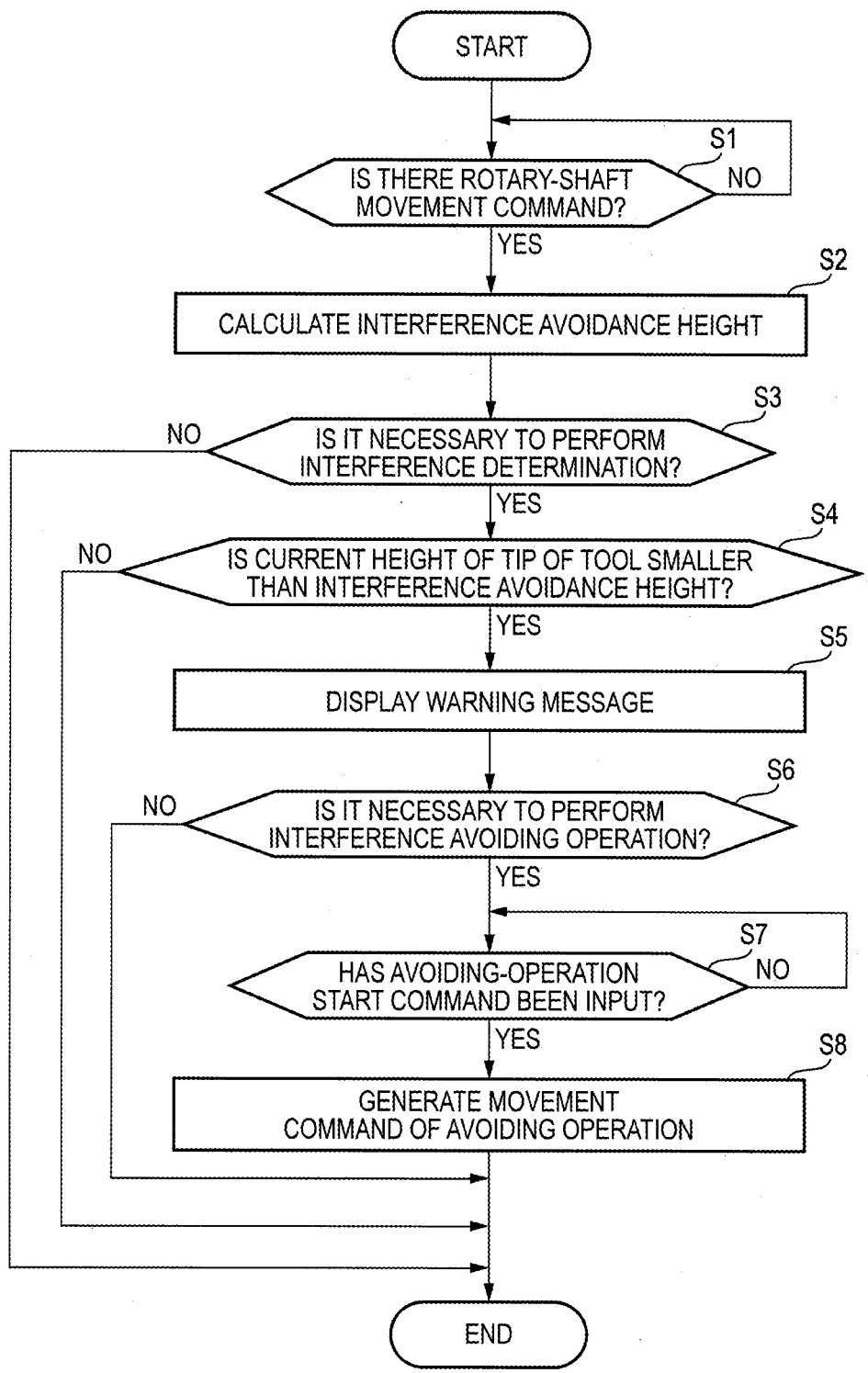
FIG. 3 is a flow chart illustrating a procedure of an interference avoiding operation of the numerical control device according to the first embodiment of the present invention.

FIG. 3 is a flow chart illustrating an example of a process procedure of the numerical control device according to the first embodiment. Hereinafter, a description will be made with reference to FIG. 3.

First, in STEP S1, the avoidance-height calculating unit 6 determines whether the movement command shaft 21 is a rotary shaft. If the movement command shaft 21 is a rotary shaft, the process proceeds to STEP S2.

In STEP S2, the avoidance-height calculating unit 6 obtains the interference avoidance height 23 of the tool at which the tool does not interfere with the rotary table 31 and the workpiece 32 over the entire movable range of the rotary shaft to which the movement command is input.

Here, a method of obtaining the interference avoidance height 23 will be described with reference to FIGS. 4 to 5.

Figure 4:
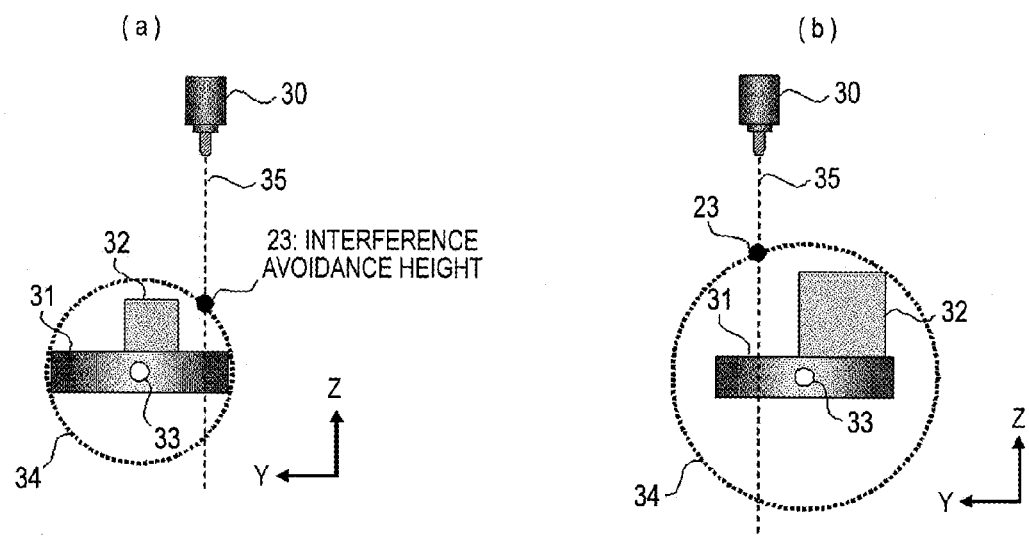
FIG. 4 is an explanatory view of an interference avoidance height during rotation of a rotary shaft for tilting according to the first embodiment of the present invention.

FIG. 4 is an explanatory view of a method of obtaining the interference avoidance height 23 in a case where the movement command shaft 21 is the inclined rotary axis A. Also, FIG. 4(a) shows a case where a distance from a rotary shaft center 33 to an edge of the rotary table 31 is longer than a distance from the rotary shaft center 33 to an edge of the workpiece 32, and FIG. 4(b) shows a case where the distance from the rotary shaft center 33 to the edge of the workpiece 32 is longer than the distance from the rotary shaft center 33 to the edge of the rotary table 31. Here, the distance from the rotary shaft center 33 to the edge of the rotary table 31 can be obtained from the size (diameter or radius) of the rotary table stored in advance in the memory 5, and the distance from the rotary shaft center 33 to the edge of the workpiece 32 can be obtained from the workpiece size and the workpiece installation position stored in advance in the memory 5.

In a case where the movement command shaft 21 is the inclined rotary axis A, the avoidance-height calculating unit obtains a circle 34 having the rotary shaft center 33 as its center, and the longest distance from the rotary shaft center 33 to the edge of the rotary table 31 or the workpiece 32 as its radius, and obtains a larger one of the Z axis coordinate values of intersection points of the circle 34 and a straight line 35 in the tool shaft direction, as the interference avoidance height 23.

Figure 5:
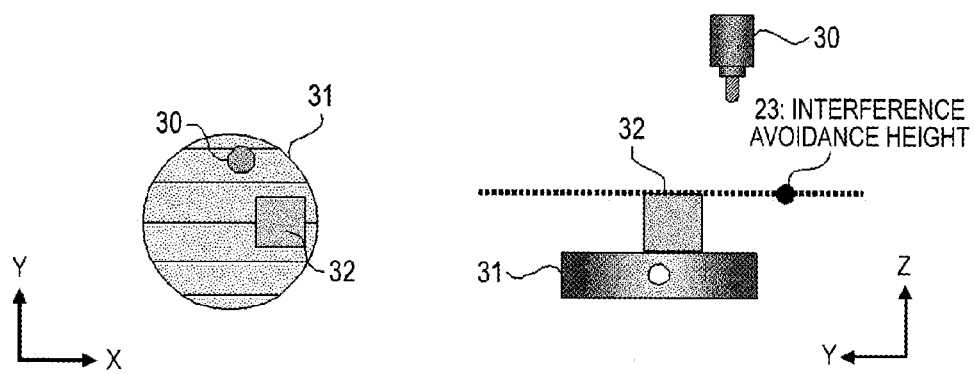
FIG. 5 is an explanatory view of an interference avoidance height during rotation of a rotary shaft for table rotation according to the first embodiment of the present invention.
Figure 6:
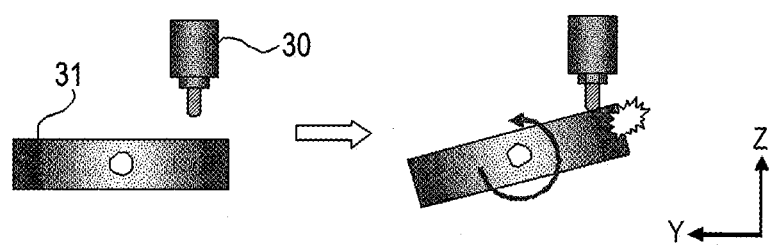
FIG. 6 is an explanatory view illustrating an interference example during rotation of the rotary shaft for tilting according to the first embodiment of the present invention.
Figure 7:
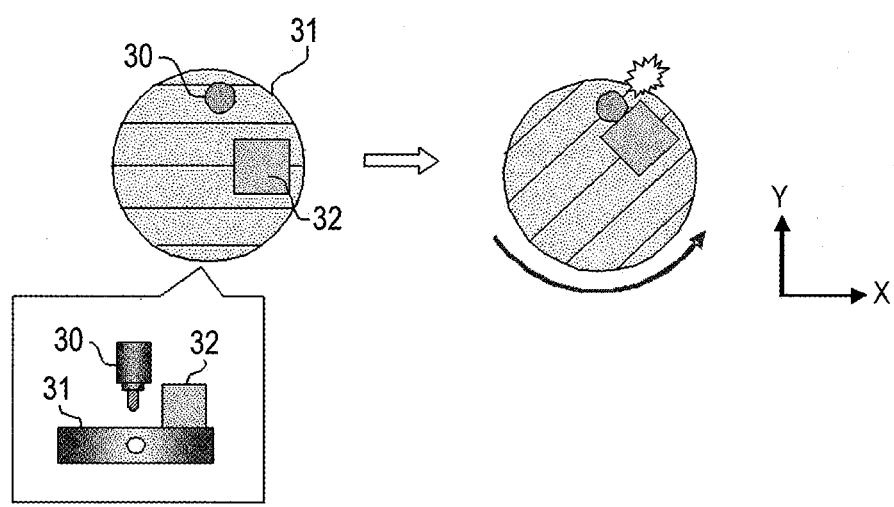
FIG. 7 is an explanatory view illustrating an interference example during rotation of the rotary shaft for table rotation according to the first embodiment of the present invention.

FIG. 5 is an explanatory view of a method of obtaining the interference avoidance height 23 in a case where the movement command shaft 21 is the rotary axis C for table rotation. In the case where the movement command shaft 21 is the rotary axis C for table rotation, the avoidance-height calculating unit obtains the maximum Z axis coordinate value of the workpiece 32, which is obtained on the basis of the workpiece size and the workpiece installation position stored in advance in the memory 5, as the interference avoidance height 23.

Subsequently, in STEP S3, the interference determining unit 7 determines whether to determine whether the tool 30 interferes with the rotary table 31 and the workpiece 32. If performing the interference determination, the process proceeds to STEP S4, and if not performing the interference determination, the process is terminated. Whether to perform the interference determination can be set from the operation screen or a PLC signal.

Subsequently, in STEP S4, the interference determining unit 7 compares the current height (Z axis coordinate value) of the tip of the tool 30 with the interference avoidance height 23 and determines that interference will occur within the movable range of the rotary shaft in a case where the current height of the tip of the tool 30 is smaller than the interference avoidance height 23. Then, the process proceeds to STEP S5. In the comparison of the current height of the tip of the tool 30 and the interference avoidance height 23, the current height of the tip of the tool 30 may be compared with a Z axis coordinate value obtained by adding a tolerance to the interference avoidance height. In this case, even if whether interference will occur is ambiguous, it is possible to determine that interference will occur.

Next, in STEP S5, the warning display unit 8 outputs the warning message 26 to the display means 3 without moving the rotary shaft to which the movement command is input. Then, the process proceeds to STEP S6.

In STEP S6, the warning display unit 8 enables the worker to determine whether to perform the interference avoiding operation of the tool 30 to the interference avoidance height 23. If the interference avoiding operation is performed, the process proceeds to STEP S7, and if the interference avoiding operation is not performed, the process is terminated. In the present embodiment, whether to perform the interference avoiding operation is set from the operation screen. However, it is also possible to set whether to perform the interference avoiding operation by a signal from the PLC.

Subsequently, in STEP S7, the warning display unit 8 waits for a worker's input for starting the interference avoiding operation of the tool 30 to the interference avoidance height 23. If the input for starting the avoiding operation is performed, the process proceeds to STEP S8.

In STEP S8, the avoiding-operation generating unit 9 generates a command for movement in the tool shaft direction, and operates the movable unit 10 to the interference avoidance height 23. The movement in the tool shaft direction may be performed until the height of the tip of the tool 30 reaches the interference avoidance height 23 or the Z axis coordinate value obtained by adding the tolerance to the interference avoidance height 23.

As described above, according to the first embodiment, in a case where the rotary shaft movement command is input, before the rotary shaft moves, it is possible to automatically evacuate the tool in the tool shaft direction up to the interference avoidance height at which the tool does not interfere with the rotary table and the workpiece over the entire movable range of the rotary shaft. Therefore, it is possible to avoid interference of the tool with the rotary table and the workpiece, without worker's manual operation for an interference avoiding operation.

Also, according to the first embodiment, in a case of determining that the tool will not interfere with the rotary table or the workpiece within the movable range of the rotary shaft to which the movement command is input, it is possible to display the warning message without performing the interference avoiding operation until the interference-avoiding-operation start command is received from the worker. Therefore, it is possible to inform the worker in advance that a shaft will operate by the interference avoiding operation without worker's intention and to enable the worker to perform the interference avoiding operation in relief.

Further, according to the first embodiment, it is possible to obtain the interference avoidance height at which interference does not occur over the entire movable range of the rotary shaft to which the movement command is input on the basis of the size and rotation center coordinates of the rotary table and the size and installation position of the workpiece. Therefore, it is possible to determine whether the tool will interfere with the rotary table and the workpiece without generating complicated tool models for every machine tool kind.

Furthermore, according to the first embodiment, it is possible to set whether to determine whether the tool will interfere with the rotary table or the workpiece from the operation screen or the PLC signal. Therefore, it is possible to set an operation mode in which the interference determination is performed only to a manual feeding mode (such as the handle feeding mode or the JOG feeding mode) such that the interference determination is not performed in an automatic operation mode.

In the first embodiment, in a case where the interference determining unit 7 receives the information (data) 36 indicating that the interference-determination is unnecessary from the operation screen (operation screen for performing parameter setting with respect to whether to perform the interference determination) or the PLC (not shown) of the numerical control device 4, the interference determining unit 7 does not perform the interference determination. However, information (data) 37 for preventing generation of the avoiding-operation command may be input from the operation screen or the PLC to the avoiding-operation generating unit 9. According to this configuration, in a case where the interference determining unit 7 performs the interference determination and determines that interference occurs, the display means 3 displays the interference warning message and (even if the worker inputs information for performing the interference avoiding operation from the operation screen of the display means 8) the avoiding-operation generating unit 9 does not generate the avoiding-operation command. Therefore, in a case where there is a possibility of interference, it is possible to display only the warning message and to prevent the interference avoiding operation in which a shaft operates without worker's intention.

INDUSTRIAL APPLICABILITY

The numerical control method and the device thereof according to the present invention is appropriately used as a numerical control method and a device thereof for checking interference of a tool with a rotary table or a workpiece in a multiaxis machine tool which has a rotary shaft and is configured to control the position and posture of the tool.

DESCRIPTION OF REFERENCE NUMERALS AND SYMBOLS

1 MOVEMENT COMMAND INPUT MEANS
2 SETTING MEANS
3 DISPLAY MEANS
4 NUMERICAL CONTROL DEVICE
5 MEMORY
6 AVOIDANCE-HEIGHT CALCULATING UNIT
7 INTERFERENCE DETERMINING UNIT
8 WARNING DISPLAY UNIT

9 AVOIDING-OPERATION GENERATING UNIT
10 MOVABLE UNIT
21 MOVEMENT COMMAND SHAFT
22 TOOL INFORMATION
23 INTERFERENCE AVOIDANCE HEIGHT
24 TOOL TIP HEIGHT
25 DETERMINATION RESULT
26 WARNING MESSAGE
27 AVOIDING-OPERATION COMMAND
28 COMMAND POSITION
30 TOOL
31 ROTARY TABLE
32 WORKPIECE
33 ROTARY SHAFT CENTER
34 CIRCLE FOR CALCULATING AVOIDANCE HEIGHT
35 STRAIGHT LINE IN TOOL SHAFT DIRECTION

The invention claimed is:

1. A numerical control method of controlling a multiaxis machine tool, the numerical control method comprising:
    a step of calculating an interference avoidance height of a tool at which the tool, which moves in a Z axis direction so as to move close to and away from a rotary table, does not interfere with the rotary table and a workpiece over an entire movable range of a rotary shaft to which a movement command is input, the step being triggered by starting of the movement command of the rotary shaft and being performed when the rotary shaft is stopped;
    a step of determining whether the tool interferes with the rotary table or the workpiece by comparing a current Z axis height of a tip of the tool with the interference avoidance height obtained in the previous step;
    a step of performing warning without moving the rotary shaft to which the movement command is input and waiting for input of a command for starting an avoiding operation to the interference avoidance height, in a case where it is determined in the previous step that interference occurs; and
    a step of generating a command for movement in the Z axis shaft direction to the interference avoidance height when the command for starting the avoiding operation is output,
    wherein the multiaxis machine tool has the rotary shaft which rotates around X axis for rotating or tilting the rotary table on which the workpiece is provided and is configured to control the posture of the tool relative to the workpiece, and
    wherein in the step of calculating the interference avoidance height, in a case where the movement command of the rotary shaft is a command for rotating the rotary shaft for tilting the rotary table, a Z axis coordinate value of an intersection point of a circle having a radius, which is the longer of a distance from a center of the rotary shaft to an edge of the rotary table and a distance from the center of the rotary shaft to an edge of the workpiece, and a straight line in the tool shaft direction is obtained as the interference avoidance height.

2. The numerical control method according to claim 1, wherein, in the step of calculating the interference avoidance height, in a case where the movement command of the rotary shaft is a command for rotating the rotary shaft for rotating the rotary table without tilting the rotary table, a maximum height coordinate of the workpiece, which is input in advance, is obtained as the interference avoidance height.

3. The numerical control method according to claim 1, wherein the method includes a step of selecting whether to determine whether the tool interferes with the rotary table or the workpiece before the step of determining whether interference will occur.

4. The numerical control method according to claim 1, wherein the method includes a step of selecting whether to perform the interference avoiding operation to the interference avoidance height obtained in the step of calculating the interference avoidance height before the step of generating the movement command.

5. A numerical control device for controlling a multiaxis machine tool, the numerical control device comprising:
    an avoidance-height calculating unit that calculates an interference avoidance height of a tool at which the tool, which moves in a Z axis direction so as to move close to and away from a rotary table, does not interfere with the rotary table and a workpiece over an entire movable range of a rotary shaft to which a movement command is input, the calculation being triggered by start of the movement command of the rotary shaft and being performed when the rotary shaft is stopped;
    an interference determining unit that determines whether the tool will interfere with the rotary table or the workpiece by comparing a current Z axis height of a tip of the tool with the interference avoidance height obtained by the avoidance-height calculating unit;
    a warning unit that performs warning without moving the rotary shaft to which the movement command is input and waiting for input of a command for starting an avoiding operation to the interference avoidance height, in a case where the interference determining unit determines that interference will occur; and
    an avoiding-operation generating unit that generates a command for movement in the Z axis direction to the interference avoidance height when the command for starting the avoiding operation is output,
    wherein the multiaxis machine tool has the rotary shaft which rotates around X axis for rotating or tilting the rotary table on which the workpiece is provided and is configured to control the posture of the tool relative to the workpiece, and
    wherein, in a case where the movement command of the rotary shaft is a command for rotating the rotary shaft for tilting the rotary table, the avoidance-height calculating unit obtains a Z axis coordinate value of an intersection point of a circle having a radius, which is the longer of a distance from a center of the rotary shaft to an edge of the rotary table and a distance from the center of the rotary shaft to an edge of the workpiece, and a straight line in the tool shaft direction as the interference avoidance height.

6. The numerical control device according to claim 5, wherein, in a case where the movement command of the rotary shaft is a command for rotating the rotary shaft for rotating the rotary table without tilting the rotary table, the interference-avoidance-height calculating unit obtains a maximum height coordinate of the workpiece, which is input in advance, as the interference avoidance height.

7. The numerical control device according to claim 5, wherein the interference determining unit can select whether to determine whether the tool interferes with the rotary table or the workpiece.

8. The numerical control device according to claim 5, wherein the avoiding-operation generating unit can select whether to perform the interference avoiding operation to the interference avoidance height obtained by the interference-height calculating unit.

9. The numeric control method according to claim 1, wherein the tilting rotary table comprises the rotary shaft which rotates and tilts the rotary table.

10. The numeric control method according to claim 9, wherein, in response to a command to the rotary shaft to tilt the tilting rotary table with respect to the tool, the interference avoidance height is calculated as follows:
calculating a first distance from a center of the rotary shaft to an edge of the rotary table based on a stored size of the rotary table;
calculating a second distance from the center of the rotary shaft to an edge of the workpiece based on a stored size of the workpiece and stored installation coordinates of the workpiece;
comparing the first calculated distance with the second calculated distance to determine which one is longer;
in response to the determining yielding that the first calculated distance is longer, generating a circle having the rotary shaft center as a center of the circle and the first calculated distance as a radius of the circle;
in response to the determining yielding that the second calculated distance is longer, generating the circle having the rotary shaft center as a center of the circle and the second calculated distance as a radius of the circle; and
setting the interference avoidance height of the tool in the Z axis direction as a larger one of Z axis coordinate values of intersection points of the circle and a straight line in the tool shaft direction.

11. The numeric control method according to claim 10, wherein, in response to a command to the rotary shaft to rotate the tilting rotary table with respect to the tool, the interference avoidance height is calculated as follows:
calculating a maximum height of the workpiece based on the stored size of the workpiece and the stored installation coordinates of the workpiece; and
setting the interference avoidance height of the tool in the Z axes direction as the calculated maximum height of the workpiece.

12. The numeric control method according to claim 1, further comprising determining whether to calculate the interference avoidance height based on a mode of machining comprising an automatic mode and a manual feed mode, wherein, in response to the determining yielding the manual feed mode, performing said calculating of the interference avoidance height and wherein, in response to the determining yielding the automatic mode, skipping said calculating of the interference avoidance height.

13. A machine tool system comprising:
a workpiece;
a tool configured to machine the workpiece;
a table on which the workpiece is positioned and which comprises a rotary shaft configured to tilt and rotate the table around X axis with respect to the tool; and
a numerical control device comprising:
a memory configured to store executable operations; and
a processor configured to execute the stored operations comprising:
in response to receiving a command to start movement of the table by the rotary shaft and prior to moving the table, calculating an interference avoidance height of the tool at which the tool, which moves in a Z axis direction so as to move close to and away from the rotary table, does not interfere with the rotary table and the workpiece over an entire movable range of the rotary shaft;
determining whether the tool interferes with at least one of the rotary table and the workpiece by comparing a current Z axis height of a tip of the tool with the calculated interference avoidance height;
generating and outputting a warning prior to said moving of the table based on the determining that the tool interferes with the at least one of the rotary table and the workpiece; and
in response to receiving a command to operate in an interference avoiding mode based on the generated warning, generating a command for movement in the Z axis shaft direction to the interference avoidance height,
wherein the interference avoidance height is obtained based on a highest point in the Z axis direction at which one of the workpiece and the rotary table interfere with the tool, and
wherein, in response to the movement command of the rotary shaft being a command for tilting the rotary table around X axis, a Z axis coordinate value of an intersection point of a circle having a radius, which is the longer of a distance from a center of the rotary shaft to an edge of the rotary table and a distance from the center of the rotary shaft to an edge of the workpiece, and a straight line in the tool shaft direction is obtained, as the interference avoidance height.

14. The system of claim 13, wherein the numerical control device further comprises: a user input interface configured to receive user input of the command to operate in the interference avoiding mode and the command to start the movement of the table; and
a display screen configured to display the warning.

15. The system of claim 14, wherein the user input interface is configured to receive a command to the rotary shaft to tilt the tilting rotary table with respect to the tool, and wherein the processor calculates the interference avoidance height as follows:
calculating a first distance from a center of the rotary shaft to an edge of the rotary table based on a stored size of the rotary table;
calculating a second distance from the center of the rotary shaft to an edge of the workpiece based on a stored size of the workpiece and stored installation coordinates of the workpiece;
comparing the first calculated distance with the second calculated distance to determine which one of the first calculated distance and the second calculated distance is longer;
in response to the determining yielding that the first calculated distance is longer, generating a circle having the rotary shaft center as a center of the circle and the first calculated distance as a radius of the circle;
in response to the determining yielding that the second calculated distance is longer, generating the circle having the rotary shaft center as a center of the circle and the second calculated distance as a radius of the circle; and
setting the interference avoidance height of the tool in the Z axes direction as a larger one of Z axis coordinate values of intersection points of the circle and a straight line in the tool shaft direction.

16. The system according to claim 15, wherein, the user input interface is configured to receive a command to the rotary shaft to rotate the tilting rotary table with respect to the tool, and wherein the processor is configured to calculate the interference avoidance height as follows:

calculating a maximum height of the workpiece based on the stored size of the workpiece and the stored installation coordinates of the workpiece; and setting the interference avoidance height of the tool in the Z axes direction as the calculated maximum height of the workpiece.

17. The system according to claim 13, wherein:

the user input interface is further configured to receive a mode for the machining, the mode is one of a manual feed mode and an automatic feed mode, in response to the received mode being the automatic feed mode, the processor skips the calculating, the determining, the generating and outputting of the warning, and the generating the command for movement, in response to the received mode being the manual feed mode, the processor executes the calculating, the determining, the generating and outputting of the warning, and the generating the command for movement, and a method of calculating the interference avoidance height for a command of tiling the rotary table is different from a method of calculating the interference avoidance height for a command of rotating the rotary table.

18. The numerical control method according to claim 1, wherein, the step of calculating the interference avoidance height is based on a type of the movement command such that the interference avoidance height for the movement command being a tilt command is calculated differently from the movement command being a rotation command.

19. The numerical control method according to claim 1, wherein the interference avoidance height is a minimum height needed not to interfere with the workpiece and the rotary table during the entire movable range of the rotary shaft specified by the movement commands.

* * * * *